(12) United States Patent
Yokoyama et al.

(10) Patent No.: US 8,430,213 B2
(45) Date of Patent: Apr. 30, 2013

(54) ELECTRIC BRAKE

(75) Inventors: Atsushi Yokoyama, Hitachinaka (JP);
Yoshinari Kawahara, Hitachinaka (JP);
Satoru Kuragaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1157 days.

(21) Appl. No.: 12/278,764

(22) PCT Filed: Feb. 8, 2006

(86) PCT No.: PCT/JP2006/302579
§ 371 (c)(1),
(2), (4) Date: Dec. 31, 2008

(87) PCT Pub. No.: WO2007/091337
PCT Pub. Date: Aug. 16, 2007

(65) Prior Publication Data
US 2009/0218179 A1 Sep. 3, 2009

(51) Int. Cl.
*F16D 66/02* (2006.01)

(52) U.S. Cl.
USPC ............ 188/1.11 L; 188/1.11 E; 188/71.7; 188/72.1; 188/72.7; 188/72.8; 188/157; 188/158; 188/218 XL; 303/3; 303/20; 303/89; 303/155; 701/70

(58) Field of Classification Search ............ 188/1.11 L, 188/1.11 E; 303/3, 20; 701/70
See application file for complete search history.

(56) References Cited

U.S. PATENT DOCUMENTS

| | | | |
|---|---|---|---|
| 4,946,547 A | 8/1990 | Palmour et al. | 156/643 |
| 5,200,022 A | 4/1993 | Kong et al. | 156/612 |
| RE34,861 E | 2/1995 | Davis et al. | 437/100 |
| 5,959,316 A | 9/1999 | Lowery | 257/98 |
| 7,104,364 B2 * | 9/2006 | Godlewsky et al. | 188/1.11 L |
| 2003/0125863 A1 * | 7/2003 | Tamasho et al. | 701/70 |
| 2005/0077783 A1 * | 4/2005 | Suzuki et al. | 303/89 |
| 2007/0084682 A1 * | 4/2007 | Griffith et al. | 188/156 |
| 2007/0235267 A1 * | 10/2007 | Liebert | 188/1.11 L |

FOREIGN PATENT DOCUMENTS

| | | |
|---|---|---|
| DE | 102 12 618 A1 | 10/2003 |
| EP | 1198016 A2 | 4/2001 |
| FR | 2 835 896 A1 | 8/2003 |

(Continued)

OTHER PUBLICATIONS

International Search Report dated Mar. 14, 2006 (Two (2) pages).

(Continued)

*Primary Examiner* — Robert A Siconolfi
*Assistant Examiner* — San Aung
(74) *Attorney, Agent, or Firm* — Crowell & Moring LLP

(57) ABSTRACT

Provided is an electric brake capable of accurately estimating the brake pad temperature and securing a sufficient braking force and response. An electric brake has a disc rotor rotating with a wheel, an actuator for rectilinearly actuating a piston in the axial direction of the disc rotor by using an electric motor, a drive controller for controlling the drive of the actuator, a brake pad pressed by the piston to give a frictional resistance to the disc rotor in the direction of rotation, and a braking start position detector for detecting a braking start position of the piston where the disc rotor is brought into contact with the brake pad. The drive controller stores the braking start position detected by the braking start position detector as the maximum braking start position. When the braking start position shifts in the pressing force-increasing direction, the drive controller updates the value stored as the maximum braking-start position.

4 Claims, 5 Drawing Sheets

FOREIGN PATENT DOCUMENTS

| | | |
|---|---|---|
| JP | 2001-32868 A | 2/2001 |
| JP | 2001-280385 A | 10/2001 |
| JP | 2003-175816 A | 6/2003 |
| JP | 2003-194115 A | 7/2003 |
| JP | 2003-194119 A | 7/2003 |
| JP | 2004-60864 A | 2/2004 |
| JP | 2004-124950 A | 4/2004 |
| JP | 2004-239324 A | 8/2004 |

OTHER PUBLICATIONS

European Search Report dated Sep. 17, 2009 (Four (4) pages).

CREE® EZ700™ LED Data Sheet, CREE® EZ1000™ LED Data Sheet; CREE® EZ290™ LED Data Sheet; CREE® EZ400™ LED Data Sheet, 2007.

CREE® XThin® LED Data Sheet pp. 1-6, 2004.

Nichia Corp. White LED Part Nos. NSPW300BS, NSPW312BS, data sheets, 2004.

Related U.S. Appl. No. 61/072,546, "Emission Tuning Methods and Devices Fabricated Utilizing Methods".

Related U.S. Appl. No. 11/656,759 and U.S. Appl. No. 11/899,790, "Wafer Level Phosphor Coating Method and Devices Fabricated Utilizing Method".

* cited by examiner

ELECTRIC BRAKE

TECHNICAL FIELD

The present invention relates to a brake apparatus for an automobile, and particularly to an electric brake apparatus which generates braking force using an electric motor.

BACKGROUND ART

Conventionally, there is known development of an electric brake apparatus in which an electric motor is rotationally driven depending on the amount of stepping of a brake pedal to generate braking force using the rotational torque of the electric motor. For example, the electric brake apparatus proposed in JP-A-2001-32868 comprises an actuator having an electric motor, and is adapted to apply braking force to a wheel by pressing a brake pad against a disc rotor depending on the amount of stepping of a brake pedal.

The electric brake apparatus in the above conventional example uses the position of the brake pad at the time of releasing thrust detected by a thrust sensor when braking is finished as a braking start position; controls a gap between the brake rotor and the brake pad (hereinafter referred to as a pad gap) so that the brake pad is spaced from the braking start position by a predetermined amount when the brake is released; and controls the thrust of a piston depending on the thrust detected by the thrust sensor when generating the braking force.

When the brake is released, in order to avoid contact between the disc rotor and the brake pad (dragging of the brake) resulting from thermal deformation of the disc rotor, the temperature of the disc rotor or the temperature of the brake pad (hereinafter referred to as pad temperature) is detected by a temperature sensor, or the temperature of the disc rotor is estimated based on the cumulative value of heat energy of the disc rotor calculated based on the vehicle speed, the outside air temperature and a braking state, so that the brake pad is spaced from the disc rotor depending on the amount of thermal deformation of the disc rotor.

DISCLOSURE OF THE INVENTION

As seen in the above conventional example, in an electric brake apparatus, the pad gap and the thrust change in accordance with change in temperature of the brake disc and the brake pad. If the braking is released, the pad gap is increased due to thermal contraction of the brake pad in connection with cooling thereof, and wasteful time until starting the braking will be increased. In addition, if the temperature of the brake pad rises to reduce the hardness (rigidity) of the brake pad during braking, the amount of rotation of the motor for generating predetermined braking force increases and therefore responsiveness of generating the braking force is degraded. Further, if the temperature of the brake pad changes, the coefficient of friction between the brake pad and the disc rotor changes, and therefore the degree of deceleration of the vehicle may vary even when the brake pad is pressed with the same thrust. Furthermore, if the temperature of the brake pad is lowered during parking braking and the thermal contraction is caused thereby, the thrust decreases, and therefore, the parking brake needs to be set with great braking force in advance in order to compensate the decrease of the thrust, which promotes increase of the electric power consumption and wear of mechanical components. For securing sufficient braking force and responsiveness against these changes of the pad gap and the thrust resulting from change in temperature of the brake pad, it is necessary to grasp the temperature of the brake pad accurately and adjust the control of braking force depending on the temperature change and the thermal expansion.

However, the temperature detection by a temperature sensor in the above conventional art leads to complication of the structure and increase in size of the actuator. Further, if a temperature sensor is assembled in the disc rotor and the brake pad which are expendable parts, there is the problem that not only manufacturing cost, but also maintenance cost increase.

On the other hand, in the case of a temperature estimation method utilizing heat energy balance as in the above conventional art, it is difficult to estimate the pad temperature accurately since the heat energy balance is affected not only by outside air temperature and vehicle wind, but also by natural wind, road surface temperature and the like. Particularly when the electric brake apparatus is left for a long time after its power source is turned off, the estimation error increases, which makes it more difficult to grasp the heat energy balance accurately. Accordingly, it is difficult to estimate the pad temperature with good accuracy under all circumstances by the temperature estimation method based on the heat energy balance.

Therefore, the present invention has been made in view of the above problem, and its object is to provide an electric brake apparatus which can estimate the temperature of the brake pad with good accuracy without using a temperature sensor and can secure sufficient braking force and responsiveness even in a situation where the temperature of the brake pad varies.

The above object is achieved by a drive controller storing a braking start position detected by a braking start position detecting means as a maximum braking start position, and updating the value of the maximum braking start position when the braking start position shifts in a pressing force increasing direction or when replacement of the brake pad is detected by a pad replacement detecting means. In this way, the amount of thermal expansion and the amount of wear of the brake pad can be estimated by comparing the maximum braking start position with the braking start position at a high temperature and the braking start position after replacement of the pad, and it becomes possible to provide an electric brake apparatus which can secure sufficient braking force and responsiveness even in a situation where the temperature of the brake pad varies.

In the electric brake apparatus, it is preferable that the drive controller utilizes the braking start position detected by the braking start position detecting means as a current braking start position, updates it in a period shorter than the maximum braking start position, and calculates the amount of thermal expansion of the brake pad based on the difference between the maximum braking start position and the current braking start position. In this way, the amount of thermal expansion of the brake pad can be detected with good accuracy whenever the braking start position is detected, and if control of the braking force is performed depending on the amount of thermal expansion, it is possible to provide an electric brake apparatus which can secure sufficient braking force and responsiveness even in a situation where the temperature of the brake pad varies.

In addition, it is preferable that the drive controller stores the braking start position at the beginning of wear of the brake pad or at the time of replacing the brake pad as an initial braking start position, and calculates the amount of wear of the brake pad based on the difference between the maximum braking start position and the initial braking start position. In this way, the amount of wear of the brake pad can be detected whenever the maximum braking start position is updated, and if control of the braking force is performed depending on the amount of wear, it is possible to provide the electric brake apparatus which can secure sufficient braking force and responsiveness even in a situation where the amount of wear of the brake pad varies.

In addition, it is preferable that the drive controller changes the thrust of the piston or the position of the piston based on the difference between the maximum braking start position and the current braking start position, or the difference between the maximum braking start position and the initial braking start position. In this way, it is possible to provide the electric brake apparatus which can secure sufficient braking force and responsiveness even in a situation where the thrust of the piston or the coefficient of friction of the brake pad varies due to changes of the temperature or the amount of wear of the brake pad.

In addition, it is preferable that the drive controller changes the thrust at the time of starting a holding operation of the parking brake mechanism based on the amount of thermal expansion or the amount of wear of the brake pad. In this way, it is possible to provide the electric brake apparatus which can secure necessary and sufficient braking force of the parking brake even in a situation where the temperature or the amount of wear of the brake pad varies after the parking brake is set.

In addition, it is preferable that the drive controller changes the position of the piston at the time of starting a holding operation of the parking brake mechanism based on the maximum braking start position. In this way, it is possible to provide the electric brake apparatus which can secure necessary and sufficient braking force of the parking brake even in a situation where the temperature or the amount of wear of the brake pad varies after the parking brake is set.

BEST MODE FOR CARRYING OUT THE INVENTION

Figure 1:
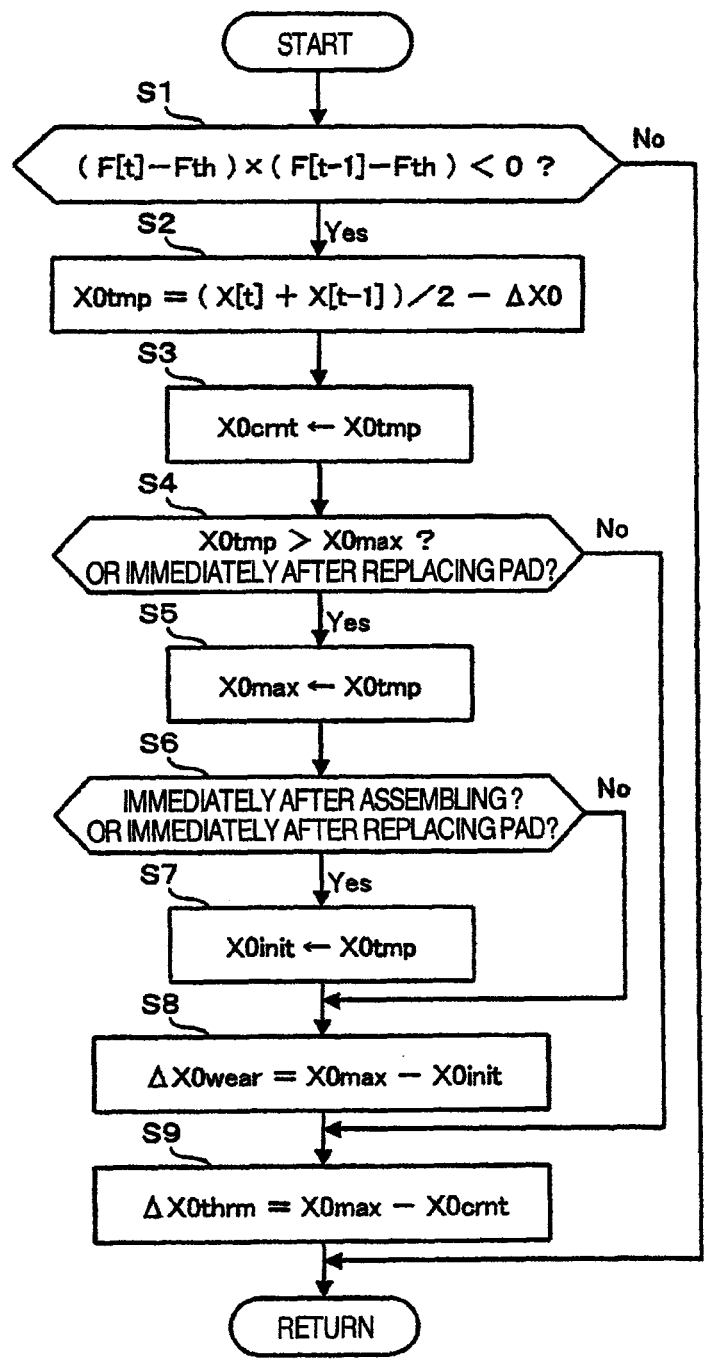
FIG. 1 is a diagram showing a flow chart of the present invention.

FIG. 1 shows an embodiment of a brake apparatus of the present invention.

The brake apparatus comprises a brake pedal 1, a pedal sensor 2 for detecting the stepping amount of the brake pedal, an operating state detection unit 3, a vehicle motion controller 4 for calculating braking force, an electric power supply 5, an actuator 6 which is an electric braking force generating mechanism, a drive controller 7 for driving the actuator 6 and for transmitting and receiving a signal, and a caliper 8.

The actuator 6 comprises a housing 9, a motor 11, a stator 12 which is a fixing part of the motor 11 to the housing 9, a motor rotor 13 which is a rotating part of the motor 11, a screw portion 14 for converting rotation of the motor rotor 13 to linear motion, a bearing 15 supporting the motor rotor 13, a piston 16 generating thrust from the rotational power of the motor rotor 13, a parking brake mechanism 20 for mechanically fixing the position of the motor rotor 13 and the piston 16 by hooking a plunger of a solenoid in a groove of the motor rotor 13, and two brake pads 21 which receive the thrust of the piston 16 to pinch a disc rotor 22.

The actuator 6 and the brake pad 21 are fixed to the floating type caliper 8. The caliper 8 is supported so as to be slidable in an axial direction of the motor 11 (the lateral direction in the drawing) with respect to an axle fixed portion interlocked with the movement of a suspension and a steering. The disc rotor 22 rotating together with a tire is arranged between the two brake pads 21. Frictional force is generated between the brake pads 21 and the disc rotor 22 by the thrust of the piston 16, and is transmitted to a road surface through the tire to generate braking force on each wheel.

The actuator 6 is provided with a rotation angle sensor 31 for detecting the rotation angle of the motor 11, and a thrust sensor 32 for detecting the thrust of the piston 16 a signal value of which varies depending on the braking force variation. The rotation angle sensor 31 is, for example, a Hall element, an encoder or a resolver. The thrust sensor 32 is, for example, a strain gauge-type load cell. The analog signals outputted from these sensors are sent to the drive controller 7 through a signal line 41 connecting each sensor and the drive controller 7.

The electric power supply 5 and the drive controller 7 are connected by a power line 42 so that electric power is supplied for driving the drive controller 7 and the motor 11. The vehicle motion controller 4 and the drive controller 7 are connected by the signal line 41. The signal line 41 transmits a signal from the vehicle motion controller 4 to the drive controller 7, while transmitting information from multiple sensors provided on the drive controller to the vehicle motion controller 4.

Hereinafter, description will be made to the operation of the brake apparatus having the above described configuration.

The pedal sensor 2 outputs an electric signal depending on the stepping amount of the brake pedal 1. The operating state detection unit 3 detects, for example, the vehicle speed, the vehicle acceleration, the turning angular speed of the vehicle, the stepping amount of an accelerator pedal by a driver, the engine throttle opening degree, the steering angle of a steering gear, the distance from and relative speed to a preceding car, the presence of an obstacle, or the road grade, and sends the electric signal depending on the respective states to the vehicle motion controller 4. Actuator information such as a motor rotation angle and a piston thrust is sent from the drive controller 7 to the vehicle motion controller 4.

Figure 2:
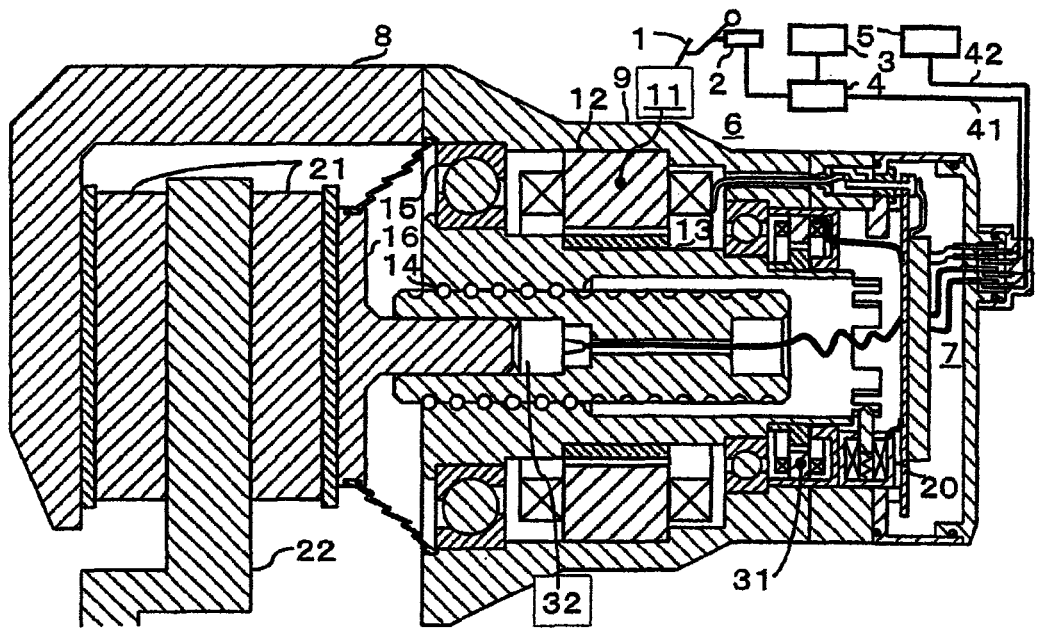
FIG. 2 is a view showing an embodiment of the present invention.

The vehicle motion controller 4 calculates a braking force requirement value for each wheel based on signals from the pedal sensor 2, the operating state detection unit 3, and the drive controller 7, and converts it into a target piston thrust. The vehicle motion controller 4 sends a signal depending on the amount of the target piston thrust to the drive controller 7. When a braking force is requested by the vehicle motion controller 4, the drive controller 7 controls the motor 11 so that a sensor signal value from the thrust sensor 32 is brought into the target piston thrust. When the motor rotor 13 is rotated in a direction (i.e. in a forward direction) so that the piston 16 advances to the pad side (in a right-hand direction in FIG. 2), the thrust is increased. When the motor rotor 13 is rotated in a direction (i.e. in a reverse direction) so that the piston 16 is retracted, the thrust is decreased. If clearance is generated between the brake pad 21 and the disc rotor 22, the piston thrust becomes zero and the braking force is released.

When the vehicle motion controller 4 generates a request signal for parking brake, the drive controller 7 controls the motor 11 until a sensor signal value from the thrust sensor 32 reaches a predetermined piston thrust value, and the parking brake mechanism 20 mechanically locks the rotation of the motor rotor 13 when the sensor signal value reaches the predetermined piston thrust value. After the braking force is maintained by the parking brake mechanism 20, the braking force is still maintained even after power to the motor 11 is cut.

When the braking force request value is zero, namely, when the braking force is released with no request for piston thrust generation, the drive controller 7 controls the motor 11 to reduce the piston thrust to zero. In order to avoid pad dragging due to contact between the brake pads 21 and the disc rotor 22, a predetermined gap is provided between the brake pads 21 and the disc rotor 22. In the position control for the pad gap, the motor 11 is controlled so that the disc rotor 22 is separated by a predetermined distance relative to a braking start position where the brake pads 21 and the disc rotor 22 are in contact with each other.

Figure 3:
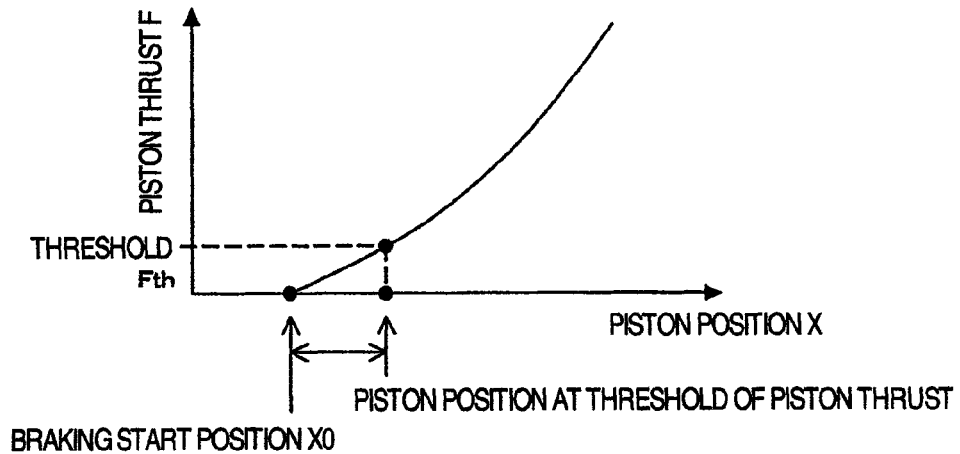
FIG. 3 is a diagram showing a braking start position of the present invention.

As shown in FIG. 3, the braking start position X0 is determined by subtracting a predetermined amount $\Delta X\alpha$ from a piston position where the piston thrust F becomes a predetermined threshold value Fth when the braking force is generated or released. The braking start position X0 may be a detected value in every detection, or a calculated value based on a plurality of detected values, such as an average detected value based on a number of past detections.

Figure 4:
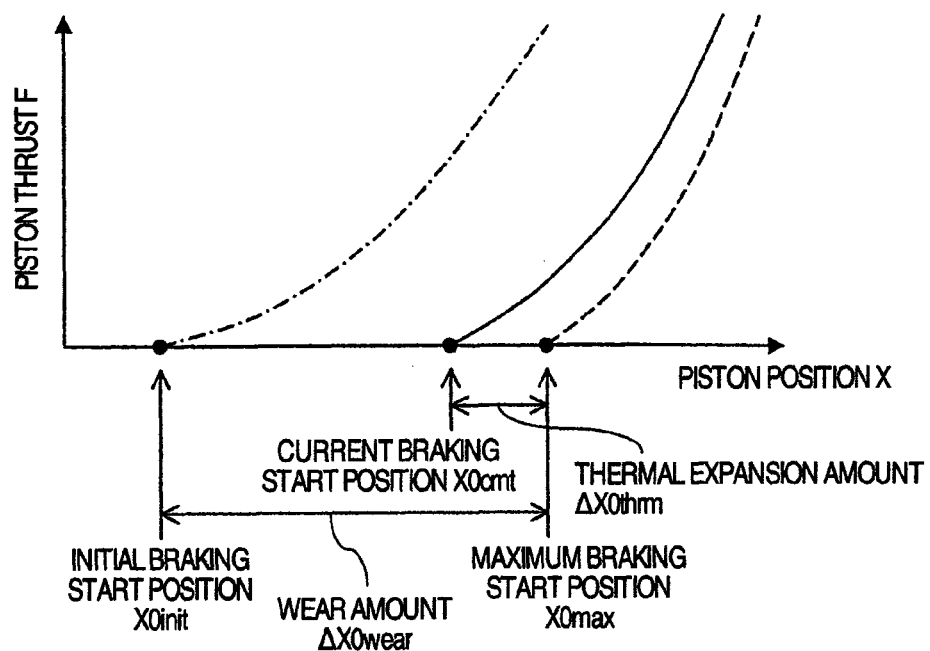
FIG. 4 is a diagram showing a braking start position of the present invention.

As shown in FIG. 4, the drive controller 7 stores three types of braking start positions detected in different times (i.e. a current braking start position X0crnt, an initial braking start position X0init, and a maximum braking start position X0max), and determines a wear amount $\Delta X$wear (hereinafter, referred to simply as a wear amount), and a thermal expansion amount $\Delta X$thrm (hereinafter referred to simply as a thermal expansion amount) of the brake pad 21 on the basis of these braking start positions.

The current braking start position is updated whenever a braking start position is determined by a detection operation. This means that the current braking start position is updated in the shortest period, and shows the latest detected braking start position.

The maximum braking start position is updated only when a newly detected braking start position is larger than the maximum braking start position stored at that time (which is positive in a wear advance direction), or when the brake pad 21 is replaced. This means that the maximum braking start position shows a braking start position when a detected position is largest in the course of wear on a particular brake pad 21. In addition, the brake pads 21 contract to reduce their thickness as the temperature decreases, so that the braking start position is increased. The outside air temperature (approximately −40° C. to +40° C.) is lower than the temperature of a braked pad (+100° C. or higher). If the braking start position is detected in a state where the pad temperature is approximately the same as the outside air temperature, for example, when the vehicle is started, the maximum braking start position reflects the progress of wear of the brake pads 21, and the braking start position at a low temperature will be detected.

As an initial braking start position, the braking start position immediately after assembling the brake pads 21 is stored. For example, the stored value is updated at the time of producing a product, or at the time of a replacement operation of brake pad replacement. At this time, since the pad temperature is approximately the same as the outside air temperature, the initial braking start position is in an initial state before wear of the brake pads 21 progresses, and is a braking start position when its temperature is equal to the outside air temperature.

The drive controller 7 estimates the amount of wear and the amount of thermal expansion of the brake pads 21 from the three types of braking start positions detected in different times. The amount of wear can be determined from the difference between the initial braking start position and the maximum braking start position. Both of the initial braking start position and the maximum braking start position represent the braking start positions at the outside air temperature, and therefore the difference in temperature of the pad at the time of detection has less effect on the difference in thickness of the pad. Accordingly, the difference between the initial braking start position and the maximum braking start position corresponds to the amount of wear of the brake pads 21. The amount of thermal expansion is determined from the difference between the current braking start position and the maximum braking start position. In contrast to the maximum braking start position, the current braking start position after braking control may increase in thickness due to the increased temperature of the pads. Since the progressing rate of pad wear is considerably slower than change of the thermal expansion amount, the difference between the current braking start position and the maximum braking start position is considered to be caused by the thermal expansion of the brake pads 21.

If there is a relatively large difference between the outside air temperature when the maximum braking start position is updated and the outside air temperature during braking, the amount of thermal expansion estimated based on the difference between the maximum braking start position and the current braking start position does not accurately show the amount of thermal expansion at the outside air temperature during braking. In this case, if it is possible to determine at what outside air temperature the maximum braking start position has been updated, the amount of thermal expansion at the outside air temperature during braking can be accurately estimated by correcting the difference between the maximum braking start position and the current braking start position depending on the outside air temperature during update. For example, if an updated value is larger than a value before the update by a predetermined value or more when updating the maximum braking start position, it can be estimated that the position has been updated at a lower outside air temperature than the previous update. Further, if a state where the difference between the maximum braking start position and the current braking start position is equal to or beyond a predetermined value when updating the current braking start position continues for more than a predetermined number of times, it can be estimated that the maximum braking start position has been updated at a low outside air temperature. In addition, the outside air temperature during update can be detected directly by an outside air temperature sensor. If it is possible to determine at what outside air temperature the maximum braking start position has been updated in this way, the difference between the maximum braking start position and the current braking start position can be corrected depending on the outside air temperature during update, and the amount of thermal expansion of pads at the outside air temperature during braking can be more accurately determined.

By determining the amount of thermal expansion of the brake pads 21 by comparing braking start positions detected at different timings in this way rather than estimation of a thermal energy balance, it is possible to accurately determine the amount of thermal expansion of pads without being affected by an outside condition nor an idling period after the power is turned off.

Hereinafter, a method for estimating the amount of thermal expansion and the amount of wear will be described with reference to a flow chart shown in FIG. 1. At S1, determination is made whether the piston thrust has passed a threshold value Fth which is a reference value for detecting the braking start position. If a value less than zero is yielded by subtracting the threshold value Fth from each of the thrust sensor value F[t] at the current time t and the thrust sensor value F[t−1] at the previous calculation step and then multiplying the results by each other, it is determined that the piston thrust has passed the threshold value. If it has passed the threshold value, the process proceeds to S2, and otherwise, the process is suspended for a while and resumes the similar processing at the next calculation step. At S2, a temporary braking start position X0temp is calculated. An average value is determined between the piston position X[t] at the current time t and the piston position X[t−1] at the previous calculation step, from which a predetermined displacement ΔXα is subtracted to yield the temporary braking start position X0temp. At S3, update is made using the temporary braking start position X0temp as the current braking start position X0crnt. At S4, determination is made whether the temporary braking start position X0temp is larger than the maximum braking start position X0max, or whether it is immediately after assembling the brake pads. If it is true, the process proceeds to S5, and if not, the process proceeds to S9. At S5, update is made using the temporary braking start position X0temp as the maximum braking start position X0max. At S6, determination is made whether it is immediately after assembling the brake pads. If it is true, the process proceeds to S7, and if not, the process proceeds to S8. At S7, update is made using the temporary braking start position X0temp as the initial braking start position X0init. At S8, the difference between the initial braking start position X0init and the maximum braking start position X0max is determined as the wear amount ΔXwear, and the process proceeds to S9. At S9, the difference between the current braking start position X0crnt and the maximum braking start position X0max is determined as the thermal expansion amount ΔXthrm, and the process proceeds to the next calculation step.

Figure 5:
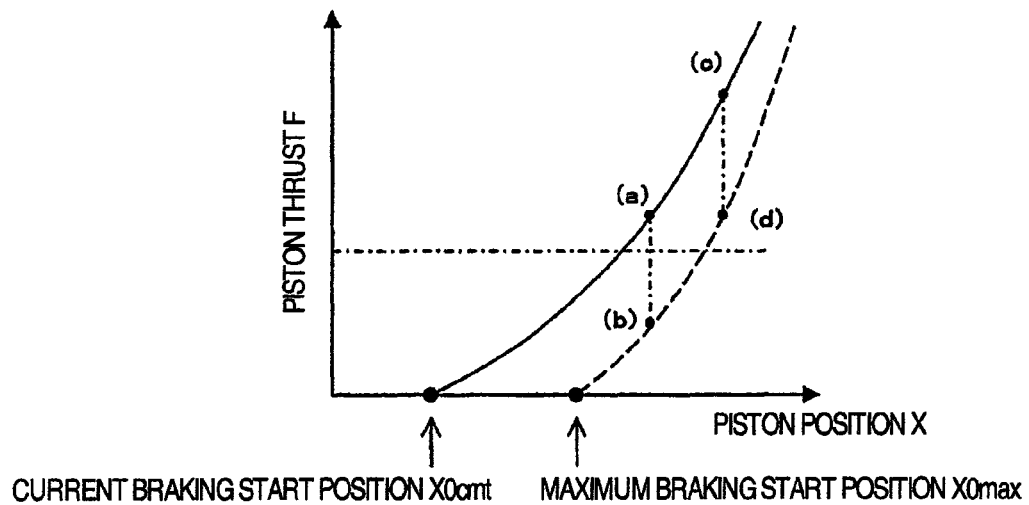
FIG. 5 is a diagram showing a parking brake state of the present invention.

If the amount of thermal expansion can be estimated, the parking brake operation on the assumption that the braking force decreases due to the thermal contraction can be realized. When the amount of thermal expansion is large, the necessary braking force to deal with the decrease of braking force due to the thermal contraction can be secured by setting the thrust of the piston to be greater than necessary holding braking force. For example, in the case where a current braking start position is different from the maximum braking start position and it is thought that the brake pad 21 is thermally expanded as shown in FIG. 5, if the braking force is held at point (a), the braking force to be held decreases to point (b) after the pad temperature lowers, and the necessary braking force cannot be secured. However, the amount of thermal expansion can be estimated based on the difference between the current braking start position and the maximum braking start position. If the braking force is held at point (c) by predicting the thermal contraction of the brake pad 21, the braking force can be secured beyond the necessary braking force to be held since the braking force to be held shifts to point (d) after the thermal contraction. In addition, when the amount of thermal expansion is small, by setting a relatively low piston thrust such as the point (d), it becomes unnecessary to set the parking brake with stronger braking force than required, resulting in reduced power consumption and reduced load on the mechanism. Although the braking force to be held has been considered as an object to be controlled in the parking brake operation, a piston position to be held may be considered as an object. In this case, regardless of thermal expansion and thermal contraction, the braking force to be held at the point (d) can be secured by setting the piston position relative to the maximum braking start position.

Figure 6:
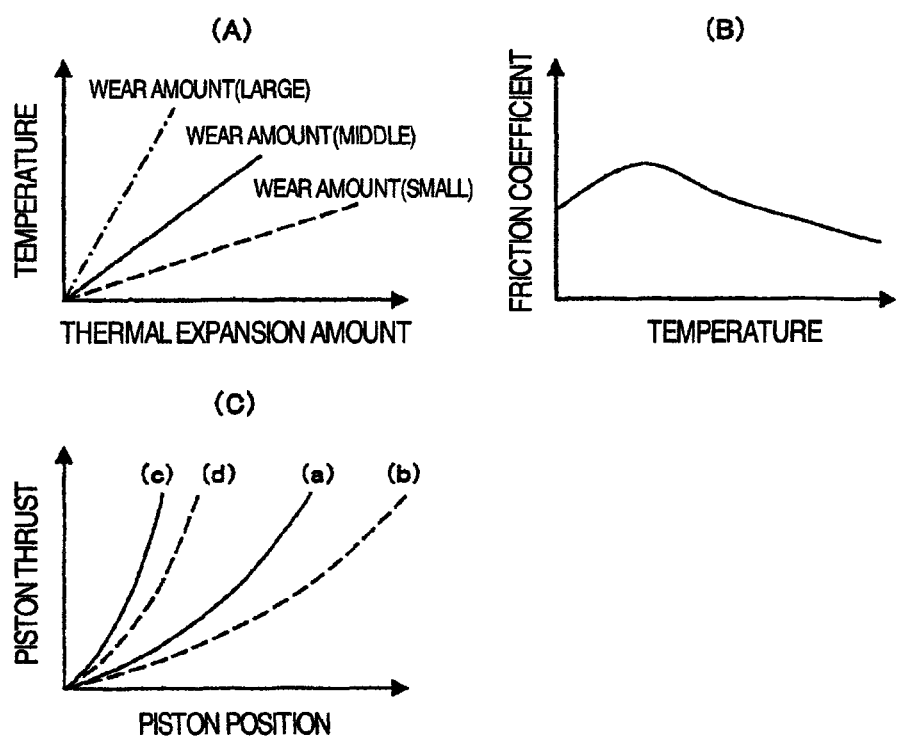
FIG. 6 is a diagrams showing a state estimation of the present invention.

The drive controller 7 estimates the temperature, the coefficient of friction, and the rigidity characteristic (the characteristic of the piston thrust with reference to the piston displacement) of the brake pad 21 based on the amount of thermal expansion and the amount of wear of the brake pad 21. The drive controller 7 stores the relation among the amount of thermal expansion, the amount of wear, and the pad temperature in advance, and estimates the pad temperature based on the amount of thermal expansion and the amount of wear. For example, the pad temperature can be estimated by storing characteristics as shown in FIG. 6-(A) in a theoretical or experimental way. If the wear of the pad progresses, the amount of thermal expansion caused by a certain temperature change relatively becomes small because of the reduction of the pad thickness. In addition, while the coefficient of friction of the brake pad 21 varies mainly depending on the pad temperature, the coefficient of friction of the brake pad 21 can be estimated by storing the relation between the temperature and the coefficient of friction thereof in advance as shown in FIG. 6-(B). Since the coefficient of friction of the brake pad 21 varies intricately depending on materials, the characteristic change thereof needs to be determined experimentally. Further, while the rigidity characteristic of the brake pad 21 varies mainly depending on the pad temperature and the amount of wear, the rigidity characteristic of the brake pad 21 can be estimated by storing the relation among the pad temperature, the amount of wear and the rigidity characteristic in advance as shown in FIG. 6-(C). In FIG. 6-(C), (a) and (b) show rigidity characteristics in the case that the amount of wear is small, in which (a) shows a rigidity characteristic at a low temperature and (b) shows a rigidity characteristic at a high temperature. The brake pad 21 becomes soft at a higher temperature, and the increase of the thrust of the piston relating to the piston position becomes milder. In FIG. 6-(C), (c) and (d) show rigidity characteristics in the case that the amount of wear is large, in which (c) shows a rigidity characteristic at a low temperature and (d) shows a rigidity characteristic at a high temperature. When the amount of wear is large, the amount of the brake pad to be deformed reduces accordingly. As a result, the increase of the piston thrust relating to the piston position becomes sharp, and the change of the rigidity characteristic relating to the temperature change becomes small. In this way, by storing the rigidity characteristic of the brake pad 21 as a function of the temperature and the amount of wear, the rigidity characteristic can be estimated.

Figure 7:
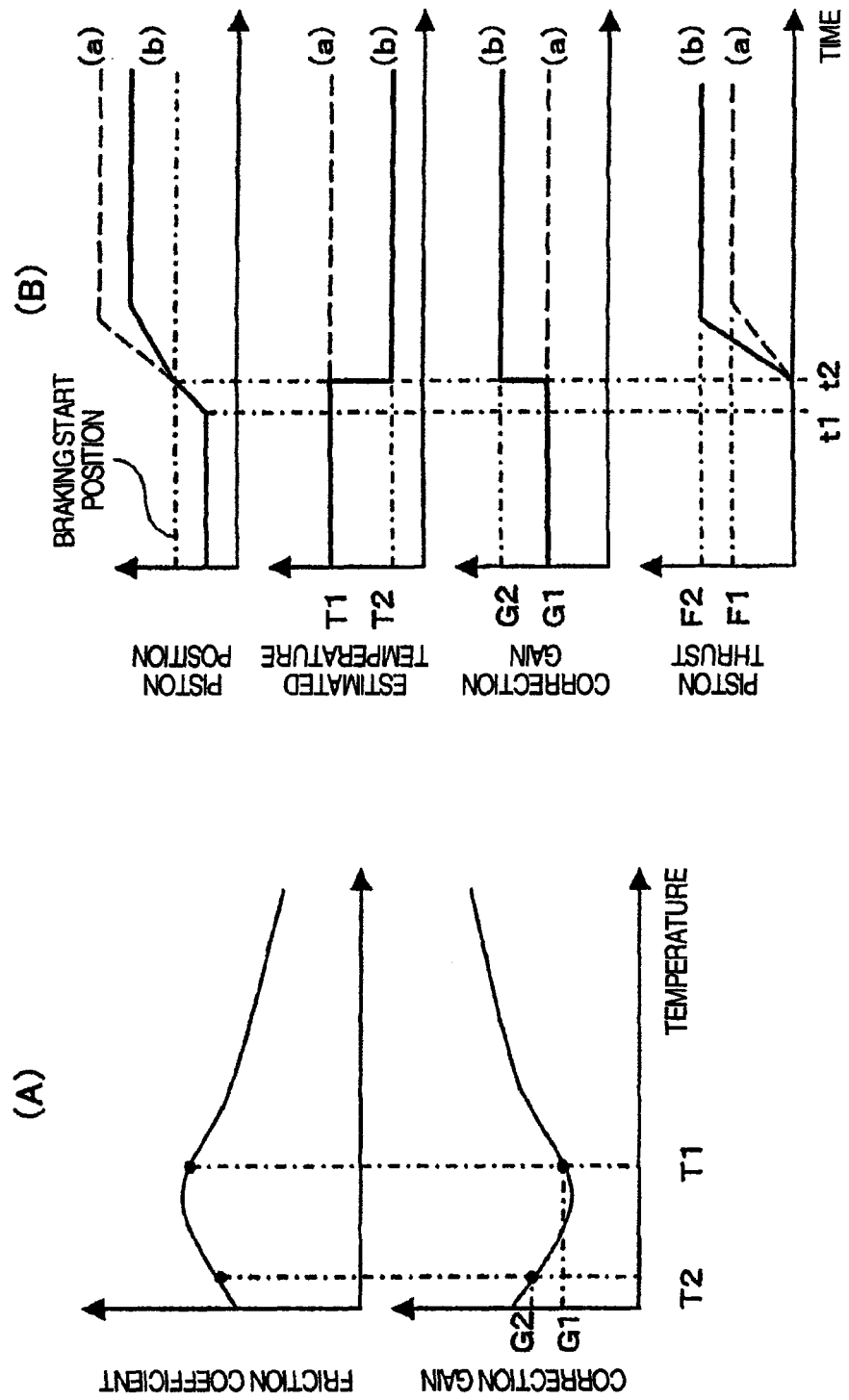
FIG. 7 is a diagram showing a correction operation in thrust control of the present invention.

If the temperature of the brake pad 21 can be estimated, thrust control depending on the change of the coefficient of friction of the pad can be realized. A correction gain with respect to a target value of the piston thrust is set in advance so that the change of the coefficient of friction depending on the pad temperature does not affect the deceleration rate of the vehicle. The change in deceleration rate of the vehicle due to the change in temperature of the pad can be suppressed by setting the thrust of the piston to be large at such a pad temperature that the coefficient of friction is small, and setting the thrust of the piston to be small at such a pad temperature that the coefficient of friction is large. As shown in FIG. 7-(A), the thrust of the piston is corrected by multiplying a control target value for controlling the thrust of the piston by a correction coefficient having inverted relation to the friction coefficient with respect to the temperature. FIG. 7-(B) shows time responses in the case where lowering of the pad temperature is detected at the time of starting the braking control. This example assumes the state where the estimated value of the pad temperature is T1 before the piston reaches the braking start position, while the pad temperature lowers to T2 at time t1. A pad gap is secured at the time of releasing the brake, and the braking control is started at the time t1. When the braking start position is updated at time t2, the estimated value of the pad temperature is updated to T2 which is lower than T1. If the estimated value of the pad temperature remains at T1, the time response will be that shown in (a) of FIG. 7-(B), but since the estimated value of the pad temperature is updated to T2, the time response changes to that shown in (b) of FIG. 7-(B). Because the coefficient of friction of the brake pad 21 is lower at the temperature T2, the correction gain G2 higher than the correction gain G1 at the temperature T1 is obtained. Accordingly, the rising gradient of the thrust of the piston becomes large, and the convergence value also shifts to F2 which is higher than F1 at temperature T1.

In addition, if the amount of thermal expansion and the temperature of the pad can be estimated, the rigidity of the pad can be estimated, and the thrust of the piston can be controlled without using a thrust sensor. As shown in FIG. 6-(C), the rigidity of the brake pad 21 decreases as the temperature increase, and increases as the temperature decreases. If the change in the thrust of the piston to the piston position as shown in FIG. 6-(C) is stored in advance, a piston position corresponding to a desired value of the thrust of the piston can be determined, and therefore the piston thrust control can be achieved by performing the feed-back control of the piston displacement without using a thrust sensor.

The invention claimed is:

1. An electric brake apparatus comprising:
a disc rotor rotating together with a wheel;
an actuator for rectilinearly actuating a piston in an axial direction of the disc rotor by using an electric motor;
a drive controller for performing drive control of the actuator;
a brake pad to be pressed by the piston to give frictional resistance to the disc rotor in a rotational direction; and
a braking start position detecting means for detecting a braking start position of the piston at which position the brake pad is brought into contact with the disc rotor, wherein
the drive controller stores the braking start position detected by the braking start position detecting means as a maximum braking start position, and updates a stored value of the maximum braking start position when the braking start position shifts in a pressing force increasing direction,
the drive controller updates the braking start position detected by the braking start position detecting means as a current braking start position at intervals shorter than those of the maximum braking start position, and calculates the thermal expansion amount of the brake pad, and
the drive controller changes the thrust of the piston or the position of the piston based on the difference between the maximum braking start position and the current braking start position, and the difference between the maximum braking start position and the initial braking start position.

2. The electric brake apparatus according to claim 1, characterized in that the drive controller stores the braking start position at the time of assembling the brake pad as an initial braking start position, and calculates the wear amount of the brake pad based on the difference between the maximum braking start position and the initial braking start position.

3. The electric brake apparatus according to claim 1, characterized in that the actuator comprises a parking brake mechanism for mechanically holding the position of the piston, and the drive controller changes the thrust of the piston at the time of holding the position of the piston by the parking brake mechanism based on the thermal expansion amount of the brake pad.

4. The electric brake apparatus according to claim 1, characterized in that the actuator comprises a parking brake mechanism for mechanically holding the position of the piston, and the drive controller changes the position of the piston at the time of holding the position of the piston by the parking braking mechanism based on the maximum braking start position.

* * * * *